US008327412B2

(12) United States Patent
Stumpf et al.

(10) Patent No.: US 8,327,412 B2
(45) Date of Patent: Dec. 4, 2012

(54) METHOD AND SYSTEM FOR INTERFERENCE-FREE SWITCHOVER BETWEEN PROGRAMME CHANNELS IN A VIDEO ENVIRONMENT

(75) Inventors: Alexander Stumpf, Frankfurt am Main (DE); Heiko Dassow, Griesheim (DE); Torsten Orth, Hoesbach (DE)

(73) Assignee: Deutsche Telekom AG, Bonn (DE)

( * ) Notice: Subject to any disclaimer, the term of this patent is extended or adjusted under 35 U.S.C. 154(b) by 602 days.

(21) Appl. No.: 12/527,648

(22) PCT Filed: Feb. 20, 2008

(86) PCT No.: PCT/EP2008/001320
§ 371 (c)(1),
(2), (4) Date: Aug. 18, 2009

(87) PCT Pub. No.: WO2008/101686
PCT Pub. Date: Aug. 28, 2008

(65) Prior Publication Data
US 2010/0033635 A1    Feb. 11, 2010

(30) Foreign Application Priority Data
Feb. 23, 2007   (DE) .................. 10 2007 009 414

(51) Int. Cl.
*H04N 7/173* (2011.01)
(52) U.S. Cl. ........... 725/118; 725/38; 725/90; 725/110; 725/114; 725/119; 725/120; 725/144; 725/148
(58) Field of Classification Search ............ 725/38, 725/90, 110, 114, 118–120, 144, 148
See application file for complete search history.

(56) References Cited

U.S. PATENT DOCUMENTS
5,602,592 A * 2/1997 Mori et al. ............... 375/240.12
(Continued)

FOREIGN PATENT DOCUMENTS
EP       1220542       7/2002
(Continued)

OTHER PUBLICATIONS

C. Ward et al. "Seamless Splicing for MPEG-2 Transport Stream Video Servers", SMPTE Journal, SMPTE Inc. Scarsdale, N.Y., US, vol. 108, No. 12, Dec. 1, 1999, pp. 873-879, XP-000894173.

(Continued)

*Primary Examiner* — Pankaj Kumar
*Assistant Examiner* — Mulugeta Mengesha
(74) *Attorney, Agent, or Firm* — Leydig, Voit & Mayer, Ltd.

(57) ABSTRACT

A method for interference-free, centrally controlled switchover from a first to a second program channel in a data transmission system for distributing encoded program data streams to multiple subscribers includes delivering at least two program data streams, each of which is associated with a separate program channel, to a separate, controllable encoder. The program data streams are encoded in the associated encoders. The encoded first and second program data streams are fed into a distribution network. One encoded program data stream is delivered through a routing device to at least one target subscriber. Control parameters are provisioned in a central control device which permits a synchronized activation of the controllable encoders and at least one switching device for interference-free switchover of the program channels. An interference-free switchover from the first to the second program channel is executed.

20 Claims, 4 Drawing Sheets

U.S. PATENT DOCUMENTS

| | | | |
|---|---|---|---|
| 6,615,039 B1* | 9/2003 | Eldering | 455/418 |
| 7,594,244 B2* | 9/2009 | Scholl et al. | 725/46 |
| 7,765,767 B2* | 8/2010 | Scholte | 52/749.1 |
| 7,912,056 B1* | 3/2011 | Brassem | 370/390 |
| 2002/0170067 A1* | 11/2002 | Norstrom et al. | 725/109 |
| 2004/0034864 A1 | 2/2004 | Barrett et al. | |
| 2004/0194134 A1* | 9/2004 | Gunatilake et al. | 725/38 |
| 2008/0059724 A1* | 3/2008 | Stifter, Jr. | 711/154 |
| 2009/0265746 A1* | 10/2009 | Halen et al. | 725/109 |

FOREIGN PATENT DOCUMENTS

| | | |
|---|---|---|
| WO | WO-0016544 | 3/2000 |
| WO | WO-0069163 | 11/2000 |
| WO | WO-2004114668 | 12/2004 |
| WO | WO-2005053301 | 6/2005 |

OTHER PUBLICATIONS

International Search Report for PCT/EP2008/001320, mailed Sep. 3, 2008.

* cited by examiner

METHOD AND SYSTEM FOR INTERFERENCE-FREE SWITCHOVER BETWEEN PROGRAMME CHANNELS IN A VIDEO ENVIRONMENT

CLAIM OF PRIORITY

This application is a U.S. national phase application under 35 U.S.C. §371 of International Patent Application No. PCT/EP2008/001320 filed Feb. 20, 2008, and claims the benefit of priority of German Patent Application No. DE 10 2007 009414.2, filed Feb. 23, 2007, the disclosures of all of which are hereby incorporated by reference in their entireties. The International Application was published in German on Aug. 28, 2008 as WO 2008/101686.

FIELD

The invention relates in general to a video or multimedia network environment for distributing programs to a plurality of subscribers, and in particular to a method and data transmission system for interference-free switching from a first program channel to a second program channel.

BACKGROUND

Methods and systems for transmission of group-specific media streams over a distribution network are adequately known. In these prior art methods, various media streams are fed into one point or multiple predetermined points in the distribution network, and at the other end of the distribution network are specifically delivered to individual subscribers or groups of subscribers through what are known as multicast replication points.

An important consideration in such multimedia communication systems is providing means that make it possible to switch from one program channel to another program channel. In this context, when switching between two program channels the problem frequently arises that visible interference in the displayed content is noticeable to the subscriber. When switching between channels at an arbitrary point in time, it is not guaranteed that a seamless transmission of the target channel or immediate playback of the target channel will be possible at the subscriber. When switching from a program currently being displayed to a new program, it is always necessary to ensure that a complete frame is transmitted when starting to display the new program, so that continuous, seamless frame construction is made possible following the switchover process, this making it possible to avoid visible interference at the subscriber.

A prior art method for seamless switchover between program channels in a digital video-based entertainment network is described in, for example, U.S. Published Application No. 2004/0034864 A1. Described therein is a system for transmitting digital video signals, which has a head end including an encoder, a device for detecting and evaluating channel-change messages, and a device for creating complete frames. The head end is connected to a subscriber-side terminal through a distribution network. A subscriber initiates a channel change by entering, at his terminal, a corresponding channel-change command that is transmitted through the distribution network to the head end. Based on the evaluation of the channel-change message, the detection device of the head end causes the encoder to generate an I-frame, which is to say a complete frame of the new target channel. The complete frame of the new target channel is then transmitted to the subscriber's terminal. In other words, the actual switchover between program channels takes place in the encoder of the head end.

SUMMARY

In one embodiment, the invention provides a method for interference-free, centrally controlled switchover from a first program channel to a second program channel in a data transmission system for distributing encoded program data streams to multiple subscribers. The method includes delivering at least two program data streams, each of which is associated with a separate program channel, to a separate, controllable encoder. A first program data stream associated with a first program channel is encoded in a first encoder. A second program data stream associated with a second program channel is encoded in a second encoder. The encoded first and second program data streams are fed into a distribution network. The encoded first program data stream is delivered through at least one routing device to at least one target subscriber, where the program data streams are played back. First and second control parameters are provisioned in a central control device which permits a synchronized activation of the controllable encoders and at least one switching device for interference-free switchover of the program channels. An interference-free switchover from the first to the second program channel is executed, including the following steps: transmitting the first control parameters to at least the second encoder, which in response to the first control parameters encodes the program data streams associated with the second program channel in a predetermined manner; and transmitting the second control parameters to the at least one switching device, which in response to the second control parameters causes the at least one routing device to deliver the second encoded program data stream to the at least one target subscriber at a time when an interference-free switchover is ensured.

In another embodiment, the invention provides a data transmission system for transmitting multiple encoded data streams to a plurality of subscribers. The data transmission system includes at least two controllable encoders, wherein each controllable encoder is configured to encode a program data stream that belongs to a separate program channel; a distribution network configured to distribute the encoded program data streams to a plurality of subscribers; at least one controllable routing device, with which is associated at least one centrally controllable switching device configured to selectively route program data streams of a centrally selectable program channel to at least one subscriber; and a central control device which, in response to a predetermined event, is configured to control at least one of the controllable encoders and the at least one centrally controllable switching device in such a manner that an interference-free switchover from a program channel currently being played to a centrally selected program channel takes place for at least one of the subscribers associated with the at least one centrally controllable switching device.

DESCRIPTION

Embodiments of the present invention provide a method and a data transmission system that permits an interference-free, which is to say seamless, switchover between program channels when the switchover is controlled from a central location and not by a subscriber.

In an embodiment of the invention different program data streams, each of which is associated with a separate program channel, are each fed into a distribution network through their own encoders and are transmitted to at least one switching device. The encoder and switching device are located at distant points in the distribution network. The encoders are located at the feed-in point. The at least one switching device is located either at the output point of the distribution point or in the vicinity of a terminal, for example in a set-top box associated with the terminal. In order to ensure an interference-free display of video information on the terminal of a subscriber following a centrally controlled change of a program channel, the encoding of the program data stream to be transmitted is synchronized with the switchover time. In other words, the encoder and switching device are coordinated from a central location such that an interference-free switchover between program channels is possible. In this regard, the central point makes use of the knowledge that the content to be displayed after the switchover differs in a predetermined way from the content displayed before the switchover. In this way, it is possible to switch between program channels at almost any time.

A method embodying the present invention encodes program data streams to multiple subscribers. The method makes possible an interference-free, centrally controlled switchover from a first program channel to a second program channel. To this end, at least two program data streams, each of which is associated with a separate program channel, are each transmitted to a controllable encoder. The program data streams associated with the first program channel are encoded in the first encoder, while the program data streams associated with the second program channel are encoded in the second encoder. The encoded program data streams are then fed into a distribution network. The program data streams associated with the first program channel are delivered through at least one routing device to at least one target subscriber, who has, for example, a television set on which the program data streams can be reproduced, for example in visual and/or acoustic form. For the case in which the method supports multicast operation, the program data streams associated with the first program channel can also be delivered to a predetermined target group. Furthermore, the method provides first and second control parameters in a central control unit that controls a synchronized activation of the encoders and at least one switching device so as to be able to switch between program channels without interference.

"Without interference" means, in particular, that a customer perceives no interference or negligible interference at his terminal during a program change. The centrally controlled switchover from the first to the second program channel is accomplished by the means that the first control parameter or parameters are transmitted at least to the second encoder, which encodes the program data streams associated with the second program channel in a predetermined manner in response to the first control parameters.

"To encode in a predetermined manner" can mean that the encoder encodes the program data streams as complete frames or partial frames as a function of the contents of the program data streams.

The second control parameter is transmitted to the switching device, which in response to the second control parameter causes the at least one routing device to route the program data streams associated with the second program channel to the at least one subscriber at a time when an interference-free switchover is ensured. This means that the program data streams belonging to the second, which is to say the new, program channel are not routed to the subscribers until the program data streams that belong to the second program channel and that permit an interference-free switchover from the first to the second program channel are completely available, for example in a set-top box associated with the target subscriber.

The program data can contain video data, for example prerecorded video programs or live video programs. Live video programs can be sporting events, for example, while prerecorded video programs can represent advertising sequences.

In order to be able to synchronize the encoders and the switching device more precisely, the second control parameters are transmitted to the switching device together with one of the program data streams. In this case, the term in-band signaling is also used. In this way, delays in the transmission of the control data and the program data streams resulting from the latency of the distribution network are avoided, since the transmission time of the control parameters and the program data streams is correlated, and the time of the switchover can be coordinated exactly, even for a finite propagation speed in the distribution network.

If the program data streams of the program channels between which switchover is to take place contain different information, then the second encoder, in response to the first control parameters, generates a set of reference information from the data in the received program data stream that is transmitted to the switching device followed by additional information on the new target program channel. In response to the second control parameters, the switching device causes the at least one routing device to perform a switchover from the first program channel to the second program channel.

Accordingly, the first and second control parameters are correlated with one another in such a way that the encoder and switching device are synchronized so that an interference-free switchover between different program channels is possible.

According to an embodiment of the invention, the encoders can encode the program data streams that are to be distributed in accordance with an MPEG standard, embed said data streams in data frames of specific length, and feed them into the distribution network.

In this case, the encoders are designed such that they can generate complete frames, which is to say I-frames, according to an MPEG standard as reference information. According to another embodiment of the invention, the program data streams are delivered to the central control device, which is also able to extract the first and second control data sets from the content contained in the program data streams.

For example, the central control device can recognize whether the contents of the program channels between which switching is to occur are identical, nearly identical, or different, and if applicable how the contents change. In this way, it is possible to facilitate an interference-free switchover between two program channels at arbitrary points in time without it being necessary to initially transmit a complete frame with regard to the new target program channel. Thus, the first control parameters extracted from the content of the program data streams can indicate that the program data streams associated with the first and second program channels contain identical or essentially identical frame contents for a predetermined time. In this case the second control parameters refer to the time period during which the program data streams arrive at the switching device with identical or essentially identical frame contents. In response to the first control parameters, the encoders generate program data streams with identical or essential identical frame contents during a predetermined time interval, wherein the switching device, in response to the second control parameters, causes the at least one routing device to perform a switchover from the first to the second program channel before the encoded data streams of the first and second encoders begin to change.

In accordance with this method, it is possible to play a new program channel to a subset of target subscribers during a predefined time span, while the original program channel continues to be offered to the remaining target subscribers.

In order to be able to offer the original program channel to the subset of target subscribers again, the first control parameters indicate that the frame contents contained in the program data streams associated with the first and second program channels are becoming similar to one another again. Accordingly, the second control parameters indicate the point in time when the program data streams have become similar to one another again. In response to the first control parameters, the encoders generate, during a predetermined time interval, program data streams with frame contents that have become similar in such a manner that interference-free or essentially interference-free switchover to the first program channel is possible. The switching device, in response to the second control parameters, again causes the at least one routing device to perform a switchover from the second to the first program channel as soon as the frame contents lo contained in the two program data streams have become similar enough to one another that interference-free or essentially interference-free switchover to the first program channel is possible.

An embodiment of the invention also provides a data transmission system, in particular a multimedia data transmission system for transmitting encoded program data streams to a plurality of subscribers. The data transmission system comprises at least two controllable encoders, wherein each encoder is designed to encode a program data stream that belongs to a separate program channel. A distribution network is provided, through which the encoded program data streams can be transmitted to a plurality of subscribers. At least one controllable routing device is provided, with which is associated at least one centrally controllable switching device in order to be able to selectively route program data streams of a centrally selectable program channel to at least one subscriber. In addition, the data transmission system has a central control device which, in response to a predetermined event, controls at least one of the encoders as well as the switching device in such a manner that an interference-free switchover from the program channel currently being played to a centrally selected program channel takes place for at least one of the subscribers associated with the switching device.

The term "interference-free" should be understood as a subjective impression that is perceived by the customer as providing little or no disruption.

In order to be able to permit interference-free switching between program channels with different contents, the central control device is designed to generate a first and a second control command. The encoders are designed to generate a set of reference information in response to the first control command, wherein the switching device, in response to the second control command, causes the routing device associated therewith to switch from the current program channel to the predetermined program channel so that the predetermined program channel starts with the display of the set of reference information.

The set of reference information is a complete frame. If an MPEG standard is used as the basis for the encoding algorithm, a complete frame is also referred to as an I-frame.

In order to be able to switch between different program channels seamlessly without the occurrence of interference effects at the subscriber, the central control device is designed to generate third and fourth control commands, wherein the encoders, in response to the third control command, can generate program data streams with identical or essentially identical contents during a first defined time interval, and wherein the program data streams of at least one of the encoders contain auxiliary data after the passage of the time interval. Furthermore, in response to the fourth control command the switching device causes the routing device associated with it to switch from the current program channel to the centrally selected program channel that is associated with the program data stream containing the auxiliary data, as long as the program data streams of the first and second encoders contain identical or nearly identical contents.

The switching device can be a part of the distribution network or can be connected to the distribution network. In this case, program data streams can be selectively delivered to a group of subscribers through a single switching device.

Alternatively, an individual controllable switching device, which can be implemented as a set-top box, for example, can be associated with each subscriber. The set-top box can also contain a routing device.

In one embodiment, the routing device is a multicast replication point.

In order to reduce the delays resulting from the latency of the distribution network between the control parameters and the program data streams to be transmitted, the encoders are designed such that they can insert the control commands intended for the switching device into the program data streams to be transmitted. In this way, the control of the encoders and the switching device can be still better synchronized, ensuring interference-free switching between different program channels.

Figure 1:
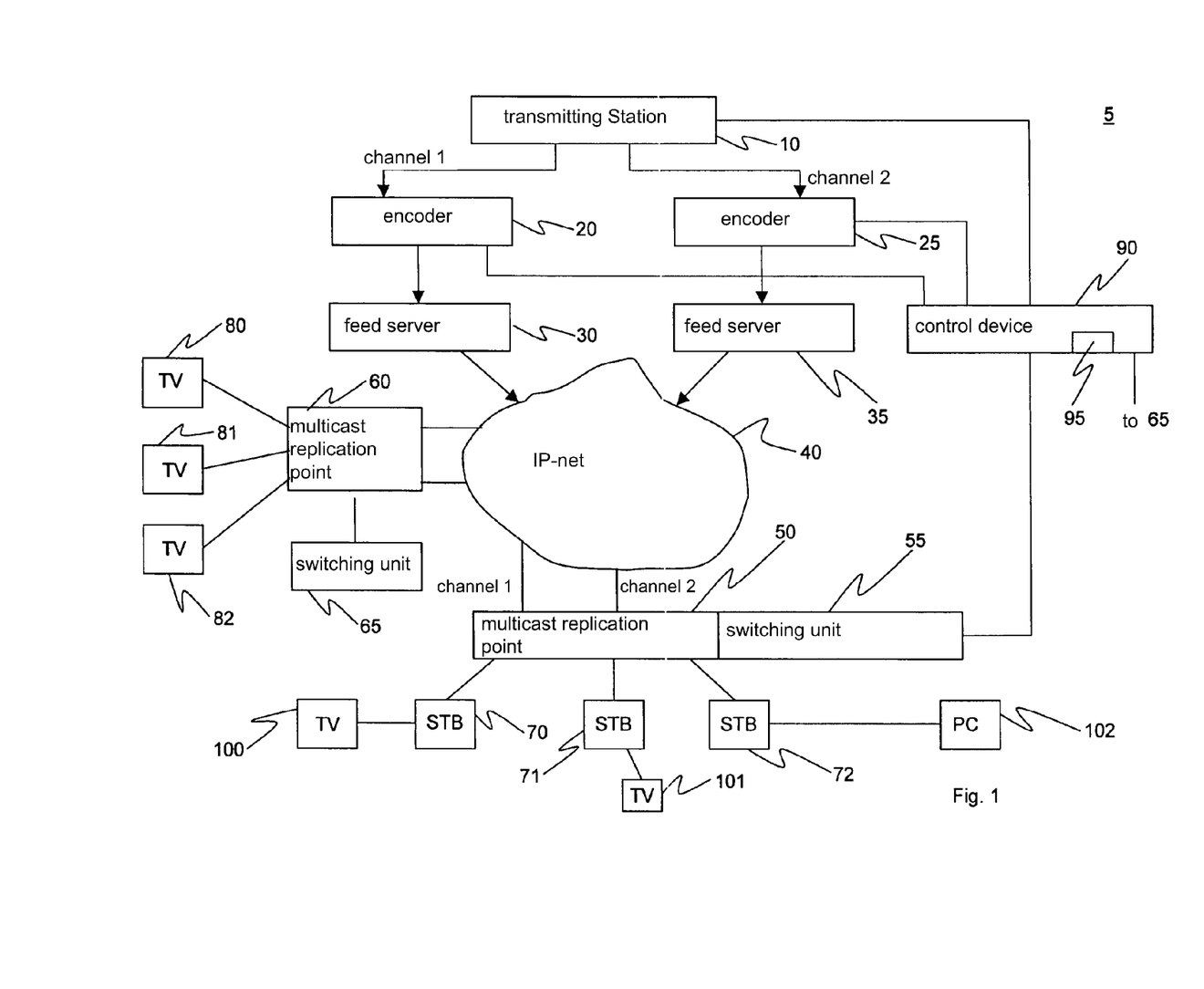
FIG. 1 a schematic block diagram of an exemplary video-based data transmission system in accordance with an embodiment of the present invention.

In FIG. 1, an exemplary video-based data transmission system 5 is shown. Two programs, for example, are transmitted through corresponding program channels by a transmitting station 10. The two channels may be transmitted through any desired wired or wireless network to an encoder in each case. Channel 1, which corresponds to the ARD television program, for example, is fed to an encoder 20, while channel 2, which corresponds to a special ARD advertising channel, is fed to an encoder 25, for example. The encoders 20 and 25 may be designed such that they can encode digital data streams to be transmitted in compliance with an MPEG standard. This means that the encoders 20 and 25 can encode the program data streams to be transmitted in so-called I-frames, which contain complete frames, B-frames, and/or P-frames, which contain only difference images. In addition, the encoders 20 and 25 have an interface through which they can be controlled by a central control device 90.

The control device 90 is additionally connected to the transmitting station 10, through which it receives the program data streams to be transmitted or relevant information on the program data streams to be transmitted from the transmitting station 10. The control device 90 can inform the encoders 20 and 25 of the manner in which they must encode the program data streams to be transmitted. The encoder 20 is connected, for example, to a feed server 30, which can feed the encoded data streams coming from the encoder 20 to a distribution network 40. The encoder 25 is connected through a feed server 35 to the distribution network 40. The feed server 35 feeds the encoded program data streams coming from the encoder 25 to the distribution network 40 as well.

Although FIG. 1 illustrates only one transmitting station and two encoders, the invention is not so limited as would be understood by a person of ordinary skill in the art. In real video-based data transmission systems, a plurality of program data streams will be fed through multiple transmitting stations and a plurality of encoders will be fed into the distribution network 40. The program data streams generated by the encoders 20 and 25 may be transmitted individually through the network 40 or, alternatively, they may be transmitted through the network in a multiplex signal. Associated with the distribution network 40 on the output side, for example, are two so-called multicast replication points 50 and 60, which feed the program data streams coming from the encoders 20 and/or 25 to an individual subscriber or a group of subscribers.

In the present example, three terminals 100, 101, and 102 are connected on the subscriber side to the multicast replication point 50. The terminals 100 and 101 may be television receivers, whereas the terminal 102 may be a personal computer. For example, the terminals 100, 101, and 102 are connected to the multicast replication point 50 through a so-called set-top box 70, 71, or 72. In a corresponding manner, terminals 80, 81, and 82 may be connected to the multicast replication point 60 directly, or likewise through a set-top box (not shown). In the present example, a switching unit 55 is associated with the multicast replication point 50, and a switching unit 65 is associated with the multicast replication point 60. The set-top boxes 70 through 72 may additionally be connected to the switching unit 55, wherein the terminals 80 through 82 may also be connected to the switching unit 65. The central control device 90 controls the encoders 20 and 25 as well as the switching units 55 and 60, specifically in such a manner that it is possible to switch in an interference-free manner between program channel 1 and program channel 2, as is explained in detail below.

Alternatively, instead of the switching unit 55 and 65 associated with the distribution network 40, it is possible to associate a switching unit with each terminal, which may, for example, be implemented in the set-top boxes 70, 71, and 72. Because of the central control device 90, the switchover time in the switching units 55 and 65 can be selected in such a manner that a switchover to a new target channel takes place before the set of reference information transmitted over the network 40 arrives at the applicable multicast replication point 50 or 60. In this way, a precise synchronization is achieved between the encoding of the program data streams to be transmitted selectively undertaken by the encoders 20 and 25, and the switchover time defined in the switching unit 55 or 65.

Below, the manner in which the video-based data transmission system 5 shown in FIG. 1 functions is explained in more detail on the basis of two example embodiments.

Now let us assume that the program channel 1 is to be delivered in common to the terminals 100, 101, and 102 associated with the multicast replication point 50, which in this case constitute a target group. In one exemplary embodiment, the transmitting station 10 transmits the video signals associated with the program channels 1 and 2 in analog form to the encoder 20 or, respectively, to the encoder 25. The encoders 20 and 25 convert the analog video signals into corresponding digital program data, and compress the data, for example in conformity with the MPEG-4 standard. The digital program data are encoded into so-called I-frames, B-frames, and P-frames, with a so-called I-frame—which is to say a complete frame—of the program to be transmitted being generated every two to four seconds, in general. The program data streams containing video data and/or audio data are embedded in MPEG containers and fed to the distribution network 40 through the feed servers 30 and 35. In the multicast operation assumed here, the MPEG containers additionally contain the target addresses of the terminals 100, 101, and 102, or of the set-top boxes 70, 71, and 72. The program data streams belonging to both program channel 1 and program channel 2 are transmitted over the network 40 to the multicast replication points 50 and 60. The switching unit 50 is programmed such that it first causes the multicast replication point 50 to route only the program data streams belonging to the program channel 1 to the terminals 100, 101, and 102. There, the program data streams are played back visually and/or acoustically.

We further assume that the program data streams belonging to the program channels 1 and 2 are transmitted to the multicast replication point 60. At the multicast replication point 60, the switching unit 65 first ensures that only the program data streams of the program channel 1 are routed to the connected terminals 80 through 82 and played back there.

The control device 90 has a memory 95 in which can be stored subscriber-specific information, for example customer profiles or other criteria for differentiation that can be evaluated by the set-top box or switching device. This information is used by the control device 90 in order to centrally carry out a targeted switching between program channels for a specific subscriber or a specific group of subscribers. Thus, the profile data stored in the memory 95 for the customers of terminals 100, 101, and 102 may lo indicate that the users of these terminals like to go skiing. In addition, the control device 90 can have been informed, for example through the transmitting station 10, of the program channel, for example channel 2, and the time, when an advertising spot on skiing will be transmitted on program channel 2. In response to the predetermined event, briefly that a skiing advertising spot will be transmitted on program channel 2, the control device 90 transmits a control command to the encoder 25. In response to this control command, the encoder 25 generates an I-frame of the program data stream containing the advertising spot. The control device 90 also transmits an additional control command to the switching unit 55. This control command can be transmitted to the switching device 50 in an MPEG container which contains program data streams of the current program. The switching unit 55 is designed such that it can read out and evaluate the information contained in the received MPEG containers.

When the switching unit 55 detects, on the basis of the control information contained in the MPEG container, that an I-frame of program channel 2 will soon be transmitted, it causes the multicast replication point 50 to transmit the program data streams associated with program channel 2, which contain the advertising spot on skiing, to the set-top boxes 70, 71, 72. Display of the advertising spot itself will start with the received complete frame of the program channel 2 on the terminals 100, 101, and 102, as shown in the bottom section of FIG. 2. Since corresponding entries about the subscribers 80, 81, and 82, which are associated with the multicast replication point 60, are not stored in the control device 90, the program data stream of program channel 1 continues to be transmitted without interruption to the terminals 80, 81, and 82.

This method ensures that interference-free switching from program channel 1 to program channel 2 is possible without disruptive image effects being perceptible on terminals 100, 101, 102, because the playback of the advertising spots on the terminals 100, 101, 102 will start with a complete frame following the program change centrally initiated by the control device 90.

Figure 2:
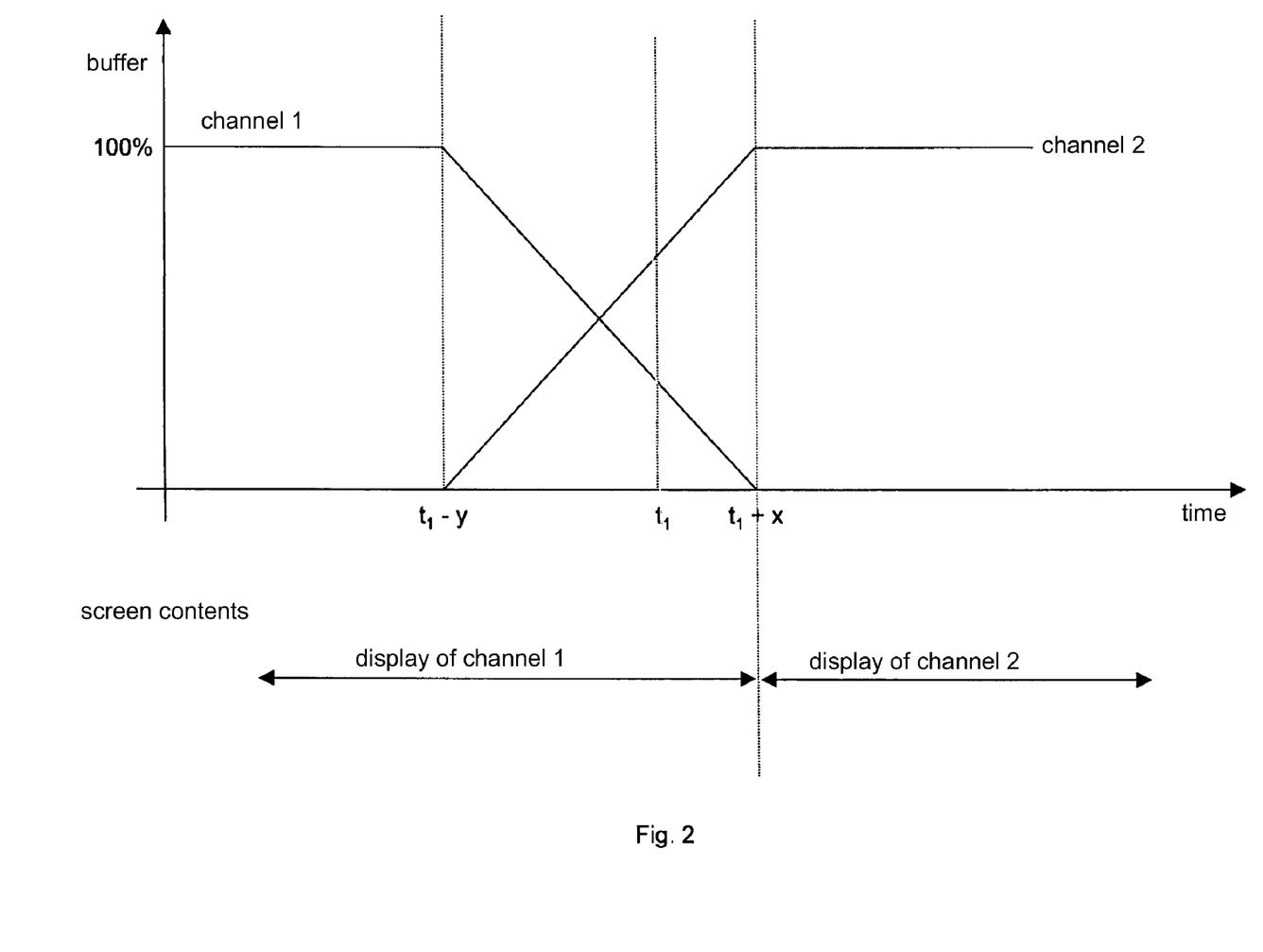
FIG. 2 depicts two timing diagrams which schematically show the memory contents of a set-top box or the screen contents displayed on a terminal in accordance with an embodiment of the present invention.

Shown schematically in FIG. 2 is a timing diagram of the switchover process; in the upper section, the program data stored in the memories (not shown) of the applicable set-top boxes 70 through 72 is shown over time. As long as the information of program channel 1 is supposed to be displayed on the terminals 100, 101, and 102, the memories will be completely filled with program data of program channel 1 through the multicast replication point 50. By means of the control command received from the control device 90, the switching unit 55 knows that a switch to the second program channel is supposed to take place at the time t1−y; this is because an advertising spot about skiing is supposed to be transmitted starting at the time t1. Starting from time t1−y, program data streams of program channel 1 will no longer be transmitted by the multicast replication point 50. Accordingly, then, no more program data from program channel 1 will be written to the memory of the set-top boxes 70 through 72. From the time t1−y to the playback time $t_1+x$, program data from program channel 1 will be transmitted to the terminals 100, 101, and 102 only from the memories of the set-top boxes 70 through 72. Starting at time t1−y, the program data belonging to program channel 2 is written into the memory of the set-top boxes 70 through 72. At time t1, the full frame generated in the encoder 25 is selectively written into the memory of the set-top boxes 70 through 72 via the multicast replication point 50. Since a full frame is now stored in the memories of the set-top boxes 70 through 72, an interference-free display of the program content of program channel 2 takes place on the terminals 100 through 102 at playback time $t_1+x$. This state of affairs is shown in the bottom section of FIG. 2. At time t1+X, there is no longer any data of program channel 1 in the memories. Instead, the memories are now only filled with program data of program channel 2, as is shown in the top section of FIG. 2. The switchover process shown in the top section of FIG. 2 takes into account the latency of the network 40, so that a switchover from program channel 1 to the new target channel 2 does not take place until the program data streams encoded by the encoder 20 or by the encoder 25 have actually been stored in the memories of the set-top boxes 70 through 72.

The control device 90 can, for example, also be informed by the operator of the transmitting station 10 of the time when the advertising spot of program channel 2 finishes. In order to make possible an interference-free switchover back to the original program channel 1, a control command is transmitted from the control device 90 to the encoder 20, which ensures that the encoder 20 again generates a complete frame at a predetermined point in time. At the same time, the switching unit 55 receives a control command from the control device 90 that signals when the switchover to the original program channel 1 is supposed to take place. The synchronization between encoder 20 and switching unit 55 ensures that, as soon as the advertising spot on program channel 2 is over, the multicast replication point 50 is caused to allow the program data streams of the first program channel to pass at the time $t_1-y$, so that a complete frame of the program channel 1 is present in the memories of the set-top boxes 70 through 72 in time, which is to say at the time t1, which frame can then be transmitted to the terminals 100, 101, and 102 after the end of the advertising spot at the time $t_1+x$, as is shown in FIG. 2. It is ensured by this means that an interference-free switchover to the first program channel 1 takes place at the end of the advertising spot transmitted in program channel 2. It should be noted here that the program data streams generated by the encoders 20 and 25 of the respective program channels 1 and 2 are transmitted over the network 40 to the multicast replication point 50 even during the switchover procedures. It should further be noted that the multicast replication point 50 has the task, among other things, of copying the program data streams belonging to the program channel 1 and distributing them to the set-top boxes 70, 71, and 72.

Figure 3:
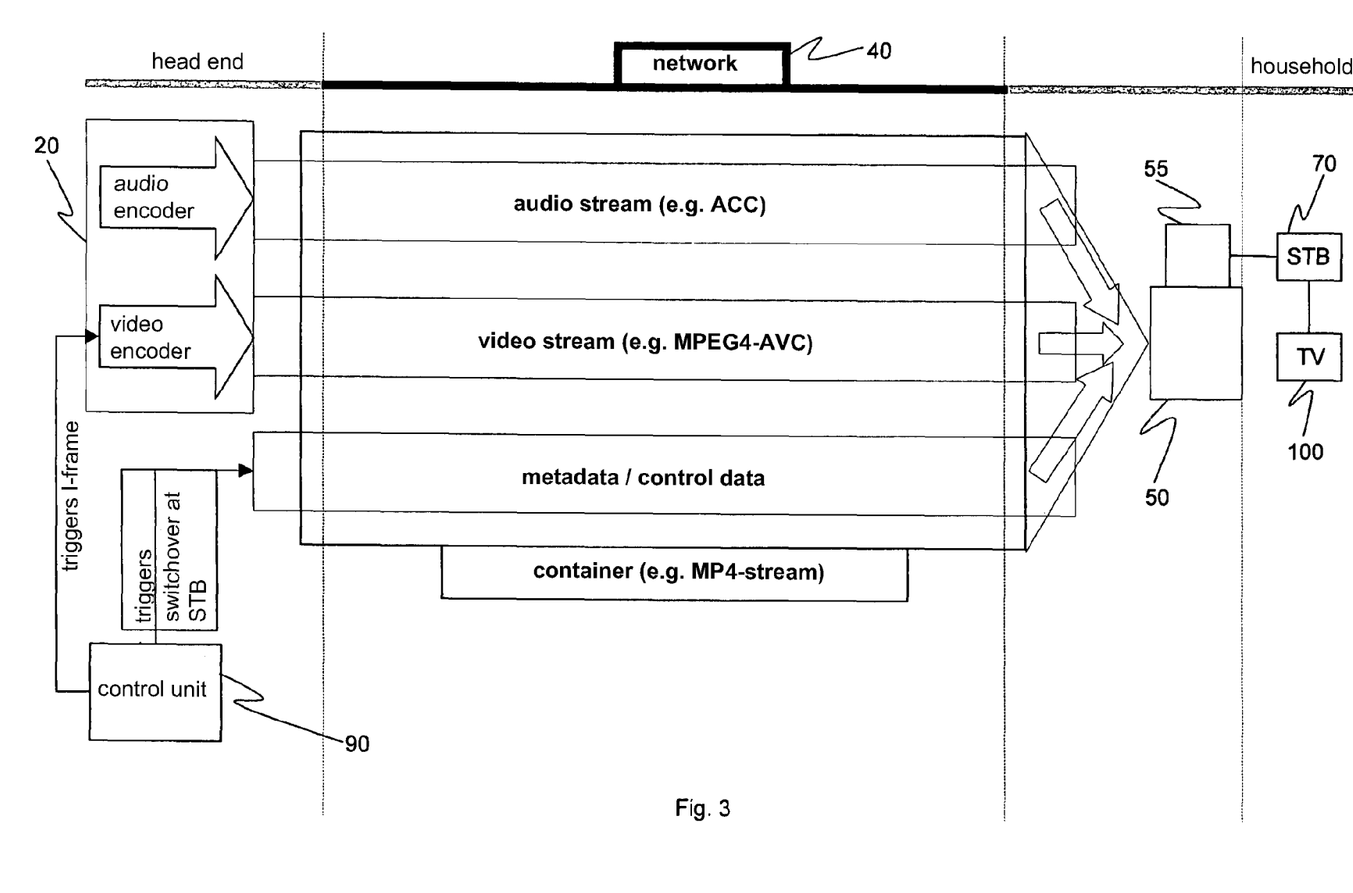
FIG. 3 illustrates a schematic block diagram of a video-based data transmission system for transmission of control parameters in accordance with in-band signaling in accordance with an embodiment of the present invention.

FIG. 3 shows an example of how control parameters can be transmitted from the control device 90 to the switching unit 55 as metadata by means of so-called in-band signaling. FIG. 3 is a simplified representation of the data transmission system shown in FIG. 1. The data transmission system is divided into three sections. The first section comprises a head end, also known as a headend, which can contain the encoders 20 and the control device 90. The encoder 20 has, for example, an audio encoder and a video encoder, which encode the audio and video data belonging to program channel 1, e.g., in compliance with the MPEG-4 standard, and insert it in one or more MPEG containers. The head end is associated with the network 40, which in the present example can also be considered to include the switching unit 55. The switching unit 55, as is also shown in FIG. 1, is associated in this embodiment with the multicast replication point 50. The third section, which is labeled household, includes the set-top boxes 70 through 72 and the terminals 100, 101, and 102, among other things. It is merely for the sake of simple representation that only the set-top box 70 and the terminal 100 connected thereto are shown in FIG. 3. The control device 90 transmits control data to the encoder 20 as well as to the switching unit 55. The control data intended for the switching unit 55 can be embedded by the encoder 20 in the MPEG container shown. For this purpose, the control data can be stored in an area that is provided under the standard for the transmission of metadata. In this way, the control data intended for the switching unit 55 can be transmitted in a common data container—together with the video data and/or audio data required for interference-free switchover—to the multicast replication point 50 or to the switching unit 55.

Figure 4:
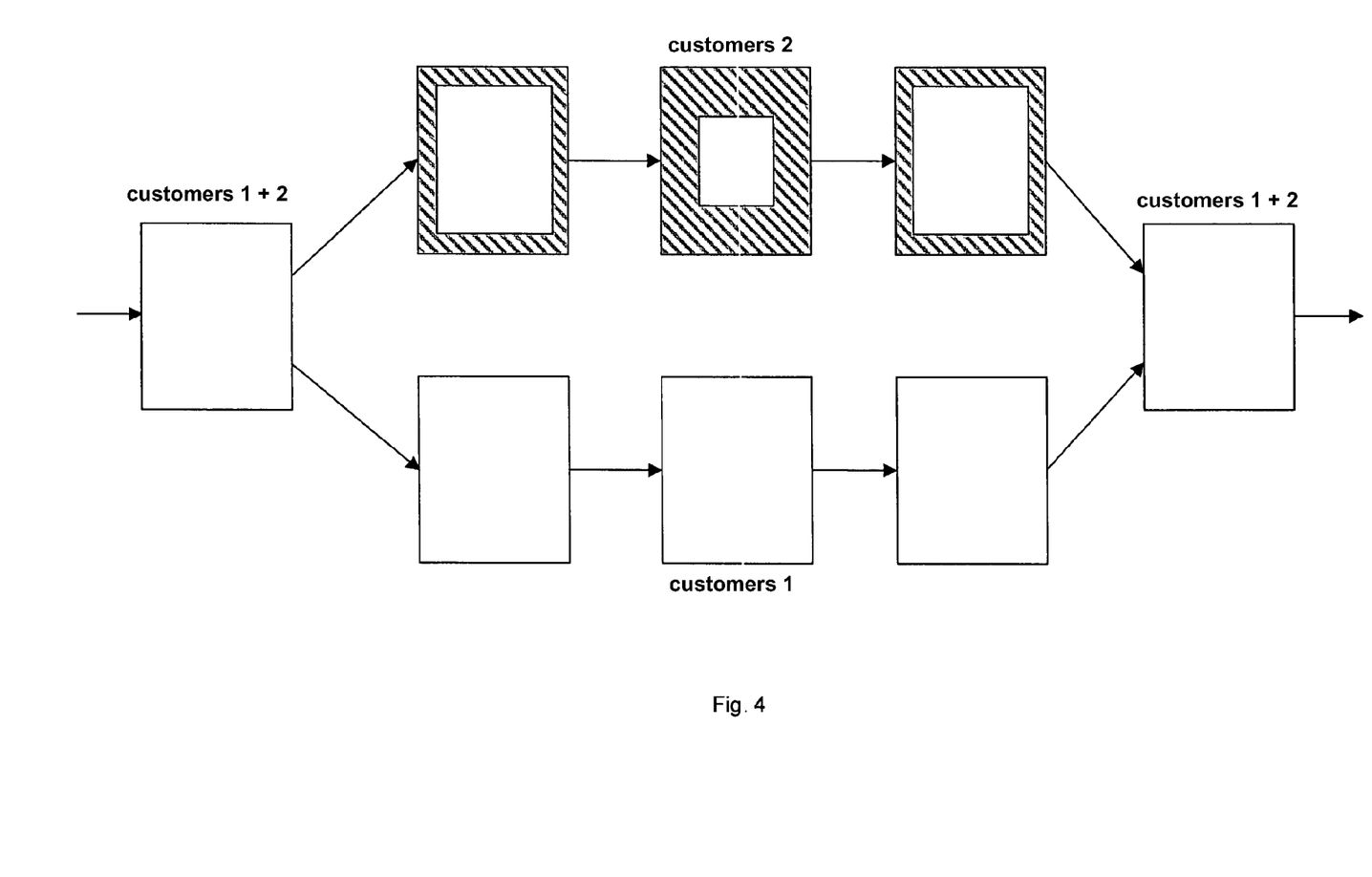
FIG. 4 depicts the time sequence during separation and joining of video streams of different channels in accordance with an embodiment of the present invention.

A second scenario, in which an interference-free switchover is to take place between different program channels, is described below in conjunction with FIG. 4. The following example relates to the case where the same feature film is to be played at the terminals 80, 81, 82 and 100, 101, and 102. Starting from a certain time, however, an advertising frame is to be faded into the feature film at, for example, the terminals 100, 101, and 102, while the feature film continues to run for the other viewers at the terminals 80, 81, and 82.

Let us assume, for example, that the same feature film is being transmitted at the same time through program channel 1 and program channel 2. As long as this is the case, it is sufficient to transmit only one of the two program channels, for example program channel 1, through the network 40 to the multicast replication points 60 and 50, which then duplicate the program data and route it to the terminals 80 to 82 and 100 to 102. Let us further assume that the control device 90 has been informed by the transmitting station 10 or the producers that an advertising frame is to be delivered to the customers at terminals 100, 101, and 102. The time at which an advertising frame is to be faded in is known to the control device. In addition, the control device 90 knows that the advertising frame is to be faded into the feature film transmitted through program channel 2. Thereupon, the control device 90 transmits, at the predetermined time, a control command to the encoder 20 as well as to the encoder 25, causing each of the encoders 20 and 25 to generate an identical frame from the received program data streams before the feature film is transmitted through program channel 2 with an advertising frame faded in. The encoders 20 and 25 or the feed servers 30 and 35 can be designed such that they transmit both program channels through the distribution network 40 to the multicast replication points 50 and 60 at a predetermined time prior to the actual switchover.

In addition, a control command is transmitted to the switching unit 55, causing the multicast replication point 50 to route the program data streams belonging to program channel 2 to the terminals 100, 101, and 102 without an objectionable switchover effect becoming visible. The control device 90 coordinates the encoders 20 and 25 and the switching unit 55 such that a switchover from the first program channel to the second program channel takes place in the multicast replication point 50 as long as both channels still transmit an identical or nearly identical image. Subsequently, an advertising frame of steadily increasing size is transmitted by the transmitting station 10 in the feature film transmitted through program channel 2, for example continuously. Since the programs of all program channels were identical or nearly identical at the switchover time, it is sufficient to transmit only the difference information for the frames of program channel 2 that are to be reproduced instead of a complete frame, even at the time of switchover. Transmission of a complete frame which permits seamless switching between the program channels is not necessary in this case. Since the control device 90 is informed of the further course of the program data transmitted through program channels 1 and 2, the control device 90 knows the time at which the advertising frame will be faded out of the program transmitted over program channel 2. The control device 90 then sends an additional control command to each of the two encoders 20 and 25, causing the encoders 20 and 25 to generate an identical or nearly identical frame with respect to the two program channels at a predetermined time. The correspondingly encoded program data streams are once again transmitted through the feed servers 30 and 35 and the distribution network 40 to the multicast replication point 60 and to the multicast replication point 50. In addition, a control command is transmitted to the switching unit 55, which indicates to the multicast replication point 50 the time when the program data streams associated with program channels 1 and 2 are identical or nearly identical. The switching unit 55 and/or the multicast replication point 50 is designed such that it can detect from the received program data streams belonging to program channels 1 and 2 when identical or nearly identical frames are present on both program channels. As soon as the appropriately encoded program data streams are present in the memories of the set-top boxes 70 to 72, the program data streams are transmitted to the terminals 100 to 102. In this way, a switchover from program channel 2 to program channel 1 takes place in such a manner that no visible interference can be detected on the terminals 100, 101, and 102. Transmission of a complete frame, which permits seamless switching between the program channels, is not necessary in this case. The corresponding method is schematically shown in FIG. 4, which schematically represents the selective insertion of advertising for a specific group of subscribers.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

[FIG. 1]
10 transmitting station
20 encoder
25 encoder
30 feed server
35 feed server
40 IP network
50 multicast replication point
55 switching unit
60 multicast replication point
65 switching unit
90 control device
Kanal=channel
TV=TV
STB=STB
PC=PC
[FIG. 2]
Puffer=buffer
Kanal=channel
Zeit=time
Bildschirminhalt=screen contents
Darstellung Kanal=display of channel
[FIG. 3]
Headend=head end
Audio-Kodierer=audio encoder
Video-Kodierer=video encoder
Triggert I-frame=triggers I-frame
Triggert Umschaltung . . . =triggers switchover at STB
Steuerung=control unit
Netz=network
Audio-Stream (z.B. ACC)=audio stream (e.g., ACC)
Video-Stream . . . =video stream (e.g., MPEG-4-AVC)
Metadaten . . . =metadata/control data
Container . . . =container (e.g., MP-4 stream)
Haushalt=household
STB=STB
TV=TV
[FIG. 4]
Kunden=customers

What is claimed is

1. A method for interference-free, centrally controlled switchover from a first program channel to a second program channel in a data transmission system for distributing encoded program data streams to multiple subscribers, the method comprising:
   delivering at least two program data streams, each of which is associated with a separate program channel, to separate, controllable encoders;
   encoding a first program data stream associated with a first program channel in a first encoder;
   encoding a second program data stream associated with a second program channel in a second encoder;
   feeding the encoded first and second program data streams into a distribution network;
   delivering the encoded first program data stream through at least one routing device to at least one target subscriber, where the first program data stream is played back;
   determining that playback at the at least one target subscriber is to be switched over to the second program data stream;

sending a control command to the second encoder to generate a set of reference information corresponding to the second program data stream;

delivering the generated set of reference information through the at least one routing device to the at least one target subscriber; and delivering an additional control command to at least one switching device that causes playback at the at least one target subscriber to be switched over to the second program data stream after the generated set of reference information is delivered.

2. The method according to claim 1, wherein the at least two program data streams contain recorded video programs or live video programs.

3. The method according to claim 1, wherein the additional control command is delivered to the at least one switching device in a container with at least one of the encoded first and second program data streams.

4. The method according to claim 1, wherein the first and second encoders encode the program data streams that are to be distributed in accordance with an MPEG standard, and feed said data streams in frames of specific length into the distribution network, and wherein the set of reference information is an I-frame.

5. The method according to claim 1, wherein the control command and the additional control command are based on content extracted from the at least two program data streams.

6. The method according to claim 5, further comprising:

determining that the first and second program data streams contain identical or essentially identical frame contents for a predetermined time; and wherein delivering the additional control command to at least one switching device causes playback at the at least one target subscriber to be switched over to the second program data stream while the first and second program data streams contain identical or essentially identical frame contents.

7. The method according to claim 6, wherein the additional control command further causes playback to switch over back to the first program data stream after playback of contents of the second program data stream and after the frame contents of the first and second program data streams channels are becoming similar to one another.

8. A data transmission system for transmitting multiple encoded data streams to a plurality of subscribers, comprising:

at least two controllable encoders, wherein each controllable encoder is configured to encode a program data stream that belongs to a separate program channel, a distribution network configured to distribute the encoded program data streams to a plurality of subscribers, at least one controllable routing device, with which is associated at least one centrally controllable switching device configured to selectively route program data streams of a centrally selectable program channel to at least one subscriber, and a central control device, configured to:

determine that playback at the at least one target subscriber is to be switched over from a first program data stream to a second program data stream; and send a control command to an encoder corresponding to the second program data stream to generate a set of reference information corresponding to the second program data stream; and wherein the at least one controllable routing device is further configured to receive the generated set of reference information; and wherein the central control device is further configured to deliver an additional control command to the at least one centrally controllable switching device to cause playback at at least one target subscriber to be switched over from the first program data stream to the second program data stream after the generated set of reference information is delivered.

9. The data transmission system according to claim 8, wherein playback of the second program data stream at the at least one target subscriber starts with the display of the set of reference information.

10. The data transmission system according to claim 8, wherein the set of reference information is an I-frame.

11. The data transmission system according to claim 8, wherein the central control device is further configured to determining that the first and second program data streams contain identical or essentially identical frame contents for a predetermined time; and wherein delivery of the additional control command to the at least one centrally controllable switching device causes playback at the at least one target subscriber to be switched over to the second program data stream while the first and second program data streams contain identical or essentially identical frame contents.

12. The data transmission system according to claim 8, wherein the at least one centrally controllable switching device is associated with the at least one target subscriber.

13. The data transmission system according to claim 8, wherein the at least two controllable encoders are configured to insert control commands intended for the at least one centrally controllable switching device into program data streams to be transmitted.

14. The data transmission system according to claim 8, wherein the at least one routing device is a multicast replication point.

15. The data transmission system according to claim 8, wherein a respective one of the at least one controllable routing device and a respective one of the at least one centrally controllable switching device are associated with each subscriber.

16. The method of claim 1, wherein the set of reference information is a partial frame including one or more difference images corresponding to differences between contents of the first and second program data streams.

17. The data transmission system according to claim 8, wherein the set of reference information is a partial frame including one or more difference images corresponding to differences between contents of the first and second program data streams.

18. A method for interference-free, centrally controlled switchover from a first program channel to a second program channel in a data transmission system for distributing encoded program data streams to multiple subscribers, the method comprising:

delivering at least two program data streams, each of which is associated with a separate program channel, to a separate, controllable encoder;

encoding a first program data stream associated with a first program channel in a first encoder;

encoding a second program data stream associated with a second program channel in a second encoder;

feeding the encoded first and second program data streams into a distribution network;

delivering the encoded first program data stream through at least one routing device to at least one target subscriber, where the program data streams are played back;

provisioning first and second control parameters in a central control device which permits a synchronized activation of the controllable encoders and at least one switching device for interference-free switchover of the program channels; and executing an interference-free switchover from the first to the second program channel, including the following steps:

transmitting the first control parameters to at least the second encoder which in response to the first control parameters encodes the program data streams associated with the second program channel in a predetermined manner; and transmitting the second control parameters to the at least one switching device, which in response to the second control parameters causes the at least one routing device to deliver the second encoded program data stream to the at least one target subscriber at a time when an interference-free switchover is ensured;

wherein the first and second control parameters are extracted from content contained in the at least two program data streams;

wherein the first control parameters indicate that the program data streams associated with the first and second program channels contain identical or essentially identical frame contents for a predetermined time, wherein the second control parameters indicate when program data streams with identical or essentially identical frame contents arrive, wherein the controllable encoders, in response to the first control parameters, generate program data streams with identical or essentially identical frame contents during a predetermined time interval, and wherein the at least one switching device, in response to the second control parameters, causes the at least one routing device to perform a switchover from the first to the second program channel before the encoded data streams of the first and second encoders begin to change.

19. The method according to claim 18, wherein the first control parameters indicate that the frame contents contained in the program data streams associated with the first and second program channels are becoming similar to one another, wherein the second control parameters indicate when the program data streams have become similar to one another, wherein the controllable encoders, in response to the first control parameters, generate, during a predetermined time interval, program data streams with frame contents that have become similar in such a manner that interference-free or essentially interference-free switchover to the first program channel is possible, and wherein the at least one switching device, in response to the second control parameters, causes the at least one routing device to perform a switchover from the second program channel to the first program channel as soon as the frame contents contained in the two program data streams have become similar enough to one another that interference-free switchover to the first program channel is possible.

20. A data transmission system for transmitting multiple encoded data streams to a plurality of subscribers, comprising:

at least two controllable encoders, wherein each controllable encoder is configured to encode a program data stream that belongs to a separate program channel, a distribution network configured to distribute the encoded program data streams to a plurality of subscribers, at least one controllable routing device, with which is associated at least one centrally controllable switching device configured to selectively route program data streams of a centrally selectable program channel to at least one subscriber, and a central control device which, in response to a predetermined event, is configured to control at least one of the controllable encoders and the at least one centrally controllable switching device in such a manner that an interference-free switchover from a program channel currently being played to a centrally selected program channel takes place for at least one of the subscribers associated with the at least one centrally controllable switching device;

wherein the central control device is configured to generate third and fourth control commands, wherein the at least two controllable encoders, in response to the third control command, is configured to generate program data streams with identical or essentially identical frame contents during a specific time interval, and, after the passage of the time interval, the program data streams of at least one of the at least two controllable encoders contain auxiliary data, and wherein, in response to the fourth control command, the at least one centrally controllable switching device is configured to cause the at least one controllable routing device associated with the at least one centrally controllable switching device to switch from the current program channel to the centrally selected program channel that is associated with the program data stream containing the auxiliary data, as long as the program data streams of the at least two controllable encoders encoders contain identical or nearly identical frame contents.

* * * * *